(12) United States Patent
Saad et al.

(10) Patent No.: US 12,694,588 B2
(45) Date of Patent: Jul. 28, 2026

(54) AUTOMATIC GENERATION OF COMPOSITE IMAGES

(71) Applicant: Adobe Inc., San Jose, CA (US)

(72) Inventors: Michele Saad, Austin, TX (US); Ajay Jain, San Jose, CA (US)

(73) Assignee: Adobe Inc., San Jose, CA (US)

( * ) Notice: Subject to any disclaimer, the term of this patent is extended or adjusted under 35 U.S.C. 154(b) by 145 days.

(21) Appl. No.: 18/197,963

(22) Filed: May 16, 2023

(65) Prior Publication Data

US 2024/0386633 A1 Nov. 21, 2024

(51) Int. Cl.
*G06T 11/60* (2026.01)
*G06T 5/77* (2024.01)
*G06T 7/11* (2017.01)

(52) U.S. Cl.
CPC ................ *G06T 11/60* (2013.01); *G06T 5/77* (2024.01); *G06T 7/11* (2017.01)

(58) Field of Classification Search
CPC .............. G06T 11/60; G06T 5/77; G06T 7/11
See application file for complete search history.

(56) References Cited

U.S. PATENT DOCUMENTS

| | | | |
|---|---|---|---|
| 2017/0032551 A1* | 2/2017 | Fried ........................ | G06T 7/11 |
| 2023/0118401 A1 | 4/2023 | Xu | |
| 2023/0325985 A1* | 10/2023 | Kim ........................ | G06T 5/50 |
| | | | 382/100 |
| 2024/0153093 A1* | 5/2024 | Xu ........................ | G06V 20/70 |
| 2024/0303788 A1* | 9/2024 | Kanazawa .............. | G06T 7/194 |
| 2024/0331235 A1* | 10/2024 | Smock ................... | G16C 20/70 |

\* cited by examiner

*Primary Examiner* — Jin Cheng Wang
(74) *Attorney, Agent, or Firm* — Kilpatrick Townsend & Stockton LLP

(57) ABSTRACT

Certain aspects and features of this disclosure relate to automatic generation of composite images. For example, a method involves producing a representative image corresponding to a composite image based on a presentation context of input objects and segmenting the generated objects from the representative image to extract the generated objects from the representative image. The method also includes generating an inferred disposition of each of the generated objects and transforming each of the input objects to the inferred disposition of a corresponding generated object. The method can also include transmitting, storing, display, or rendering, in response to the transforming, the composite image of the input objects. Certain aspects and features also include computer systems, apparatus, and computer programs recorded on one or more computer storage devices, each configured to perform the actions of the method.

20 Claims, 6 Drawing Sheets

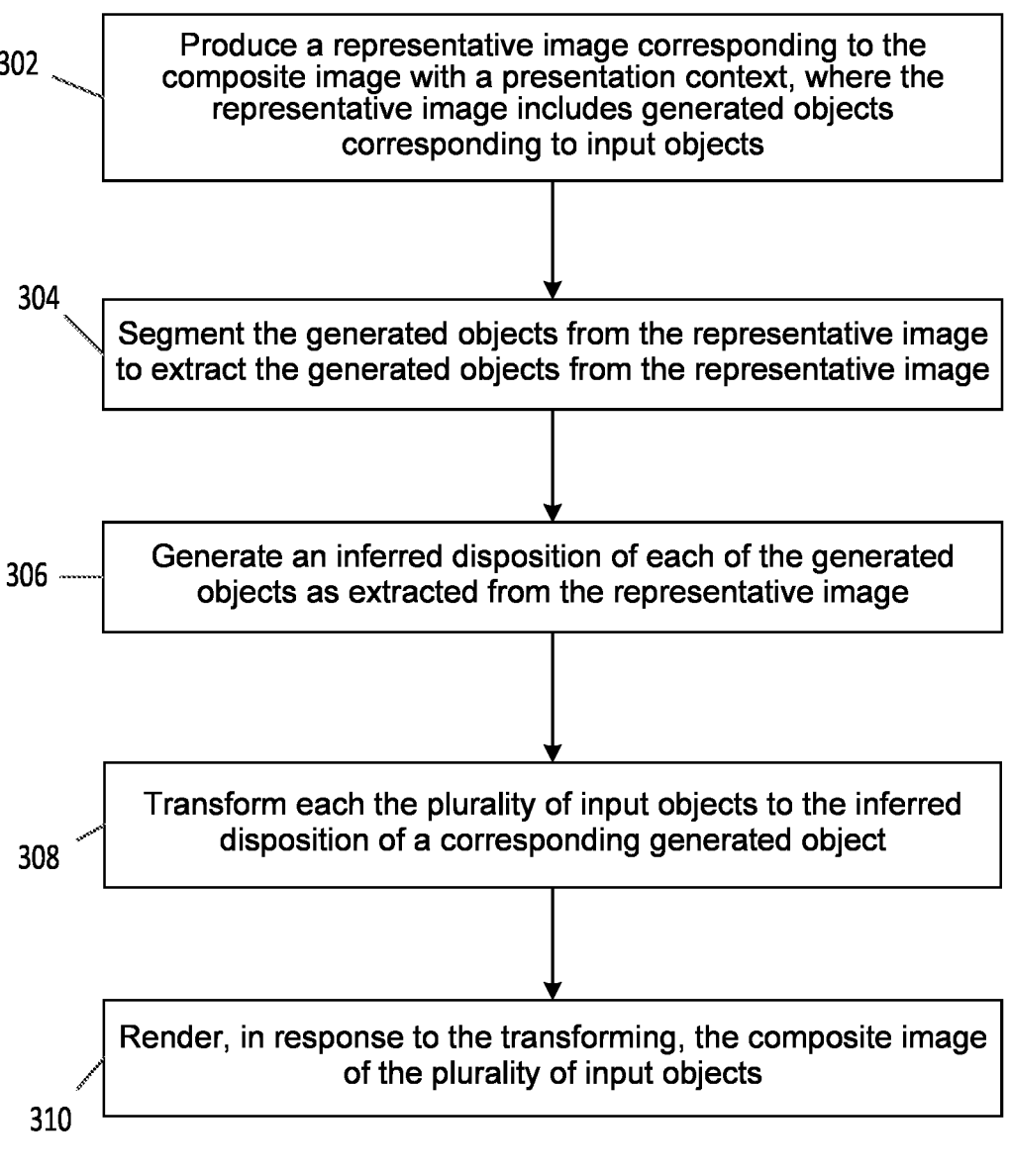

302 — Produce a representative image corresponding to the composite image with a presentation context, where the representative image includes generated objects corresponding to input objects 304 — Segment the generated objects from the representative image to extract the generated objects from the representative image 306 — Generate an inferred disposition of each of the generated objects as extracted from the representative image 308 — Transform each the plurality of input objects to the inferred disposition of a corresponding generated object 310 — Render, in response to the transforming, the composite image of the plurality of input objects

AUTOMATIC GENERATION OF COMPOSITE IMAGES

TECHNICAL FIELD

The present disclosure generally relates to computerized digital image generation. More specifically, but not by way of limitation, the present disclosure relates to programmatic techniques for accurately identifying relevant objects in multiple pre-stored images and producing a new composite image that includes accurate representations of the objects.

BACKGROUND

Images that depict groups or "bundles" of objects from multiple sources can be useful in many fields, including merchandising, graphical design, and visual effects, as just a few examples. To create such an image, the person in need of such a "composite image" can use image editing software that includes appropriate masking and layering tools to create such an image using objects depicted in preexisting digital images. Alternatively, the person in need of such a composite image may obtain examples of the actual physical objects depicted in the preexisting digital images, physically assemble or "stage" the physical objects, and either photograph the assembly of physical objects or direct a photographer to do the same.

SUMMARY

Certain aspects and features of the present disclosure relate to automatic generation of composite images. For example, a method involves producing, using a generative image model, a representative image corresponding to a composite image based on a presentation context of input objects. The representative image includes generated objects corresponding to the input objects. The method further includes segmenting, using an image mask module, the generated objects from the representative image to extract the generated objects from the representative image, and generating, using an image overlay module, an inferred disposition of each of the generated objects as extracted from the representative image. The method additionally includes transforming, using the image overlay module, each of the input objects to the inferred disposition of a corresponding generated object from among the generated objects. The method can also include transmitting, storing, display, or rendering, in response to the transforming, the composite image of the input objects.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, Embodiments, and Advantages of the Present Disclosure are Better Understood when the Following Detailed Description is Read with Reference to the Accompanying Drawings, where:

FIG. 3 is a flowchart of an example of a process for automatic generation of composite images, according to some embodiments.

DETAILED DESCRIPTION

Figure 1:
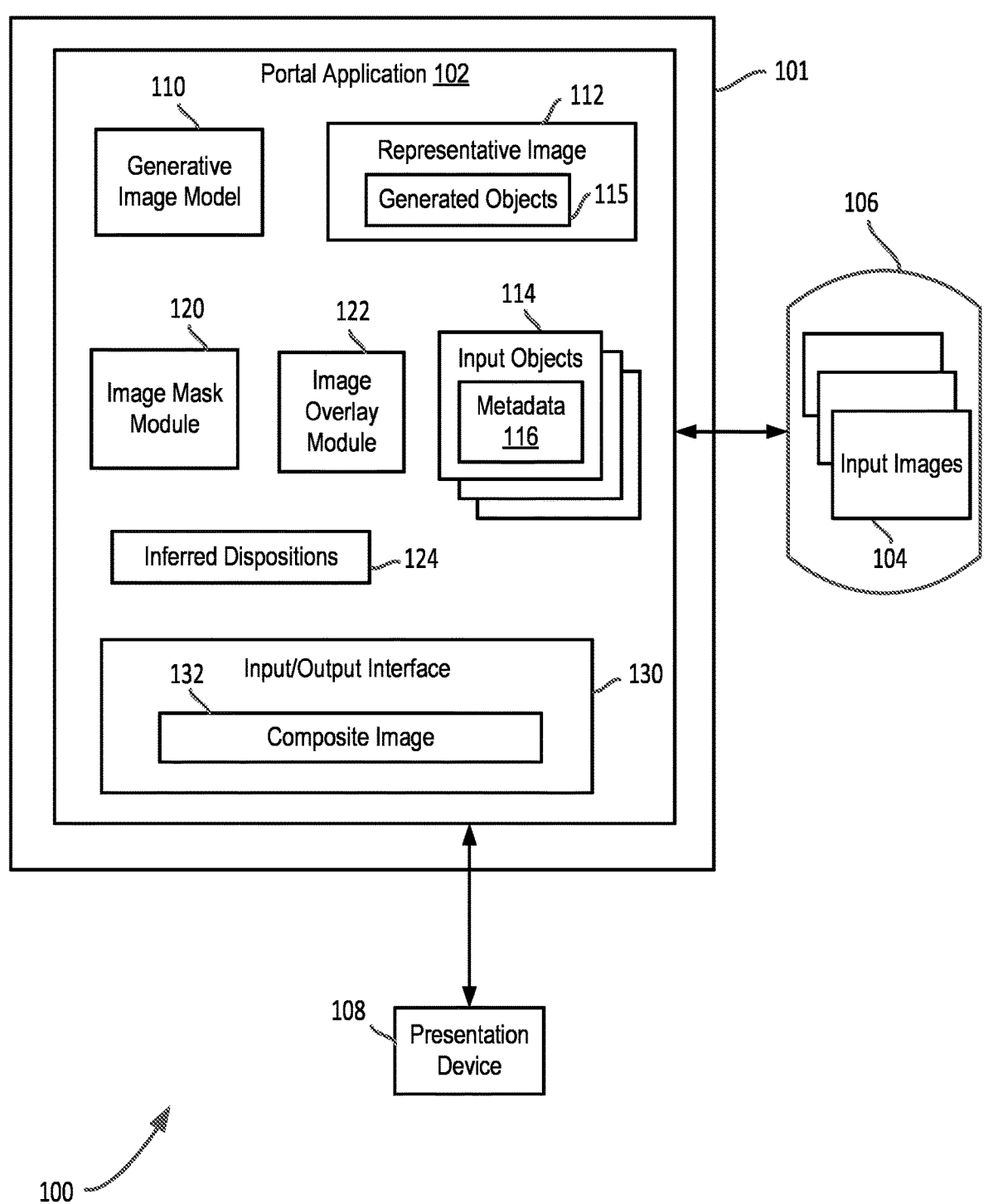
FIG. 1 is a diagram showing an example of a computing environment for automatic generation of composite images, according to certain embodiments.

As described above, images that depict groups or bundles of objects from multiple sources can be useful in many fields, including merchandising and the visual arts. Such images may be referred to herein as composite images or bundle images. In one example, a merchandizer may need to create a photograph of multiple products to be made available as a bundle or special. Such a merchandizer may offer products online through a web site, in a "brick and mortar" store based on coupon books, catalogs, or sale flyers, or any combination of these. In any of these examples, there may be a need for one or more photographs of multiple products being offered together. It can be important for a merchandizer to create meaningful and engaging photographs of the bundled products to attract attention, generate more engagement and footprint, and eventually, greater interest. To create such a photograph, the merchandizer can obtain physical samples, assemble the samples in an attractive way, and photograph them.

Another currently available path for creating a composite image is to use image editing software that includes appropriate masking and layering tools to create a composite image using objects depicted in preexisting photographs. For example, a merchandizer of gardening supplies wishing to bundle a watering nozzle, gardening tool, and a pair of gardening gloves may have stored, digital photographs of these individual items for use on an online shopping site and/or in printed catalogs and flyers. The merchandizer can use image editing software that includes appropriate masking and layering tools to create such an image using each of these objects as depicted in a preexisting digital image. This process may involve isolating an object image from each photograph, creating layers on top of a background image, transforming positions of the various objects, creating masks, and editing individual layers using the editing tools provided. Often some experimentation with different effects is needed to achieve a desired result.

Engaging in manual photography or editing may be subject to error and/or extensive labor and time delays. Either of these example techniques can be labor intensive. Contracting the image compositing task out to professional photographers or graphical design firms can be expensive. Samples of items to be assembled and photographed may not be readily available in some situations, for example, where items are stored at geographically distributed warehouses or distribution centers, or where items are drop-shipped to purchasers from a manufacturer.

Current paths to image bundling are thus labor intensive, time consuming, or expensive. Embodiments described herein address these issues by providing a repeatable, automatic, and semantically based way to access individual object images from a catalog or database of images and generate a representative and contextually relevant composite image. The composite image can represent the objects bundled together in a natural and realistic way. Embodiments described herein use semantic image analysis and generative image technology to automate and streamline the process of composite image generation, while eliminating the need to assemble physical samples or manipulate images of individual objects using photo editing software. A generative image model provides a representative image corresponding to a desired composite image, taking into account a presentation context of input images. Generated objects in the representative image include an inferred disposition, which can be used to transform, using an image overlay module, the objects from the source images to the inferred dispositions. The composite image can be rendered or stored using the input objects presented in a context-aware way.

For example, an administration portal application can receive a selection of two or more preexisting images of objects to be loaded into the application. A generative image model produces a representative image corresponding to the desired composite image. The representative image takes into account a presentation context of the input objects. For example, if the objects are related to a particular activity, environment, sport, etc., this context will be recognized and will inform the result. An image mask module segments the generated objects to extract the generated objects from the representative image. An image overlay module extracts an inferred disposition of each of the generated objects and can transform each of the input objects to the inferred disposition of a corresponding generated object. A composite image is then rendered or stored in a file for further use. The composite image includes the input objects arranged in a context-sensitive and realistic way. In some examples, multiple composite images can be provided to a display device and one or more can be accepted, rejected, or selected.

The image generating technique described herein can be used to reliably, repeatably, and efficiently receive as input, images including specific objects, and to execute computer software modules to programmatically generate one or more images to represent a bundle of the objects appearing in the input images. The composite images appear natural for the relevant context.

As used herein, the term "input object" is an object that is to appear in a composited image with other objects. To use the gardening example previously given, the watering nozzle, gardening tool, and the pair of gardening gloves are input objects. Each of these objects may appear in a preexisting photograph stored in a manner that includes metadata about the object in the photograph. The portion of the photograph with the image and the metadata together can be considered an input object. A "representative image" is a placeholder image produced by a generative image model, which includes "generated objects," which are like the input objects, but that are not the actual input objects or a photographically accurate representation of the input objects.

As used herein, the term "presentation context" refers to the semantic content of the images containing the input objects, which will inform the content of the composite images. For example, to return to the gardening example, the presentation context might be outdoors, in a greenspace with soil, or near a patio, as opposed to in an office building or a subway station. The term "disposition" refers to how an object appears with respect to scale, rotation, orientation, etc. Disposition may be actual or inferred.

FIG. 1 is a diagram showing an example of a computing environment 100 for automatic generation of composite images, according to certain embodiments. The computing environment 100 includes a computing device 101 that executes a merchandise administration portal application 102. The computing environment 100 includes a presentation device 108 that is at least at times controlled based on the portal application 102. In this example, the portal application 102 includes generative image model 110, an image mask module 120, and an image overlay module 122. An object inference module discussed below with respect to FIG. 4 infers products or other items from input images 104, to obtain input objects 114, which include metadata 116 to describe the objects and their context. The metadata is stored in database 106 with the images and also provides the information necessary to isolate the object of interest from background or other objects in the images. Generative image model 110 produces a representative image 112 with generated objects 115. The representative image 112 serves as a stored, processing placeholder for the final composite image, which will include actual images of the input objects 114 arranged in a context-appropriate environment arranged according to inferred dispositions 124.

Still referring to FIG. 1, image mask module 120 is used to extract generated objects 115 from the representative image, and image overlay module 122 inserts the input objects based on the inferred dispositions 124 to be included in the composite image 132. Portal application 102 includes an interface module 130. In some embodiments, the portal application 102 can render and display the composite image 132 on presentation device 108. Composite image 132 will include the input objects 114 in the inferred dispositions 124. These inferred positions are based on the positions of generated objects 115 from representative image 112. Embodiments as described herein can be implemented on many kinds of computing devices. Computing device 101 can be implemented as either a real or virtual (e.g., cloud-based) computing device, a server accessed through a web page, thin client, or other client application, and on a combination of any number of computing platforms.

Figure 2:
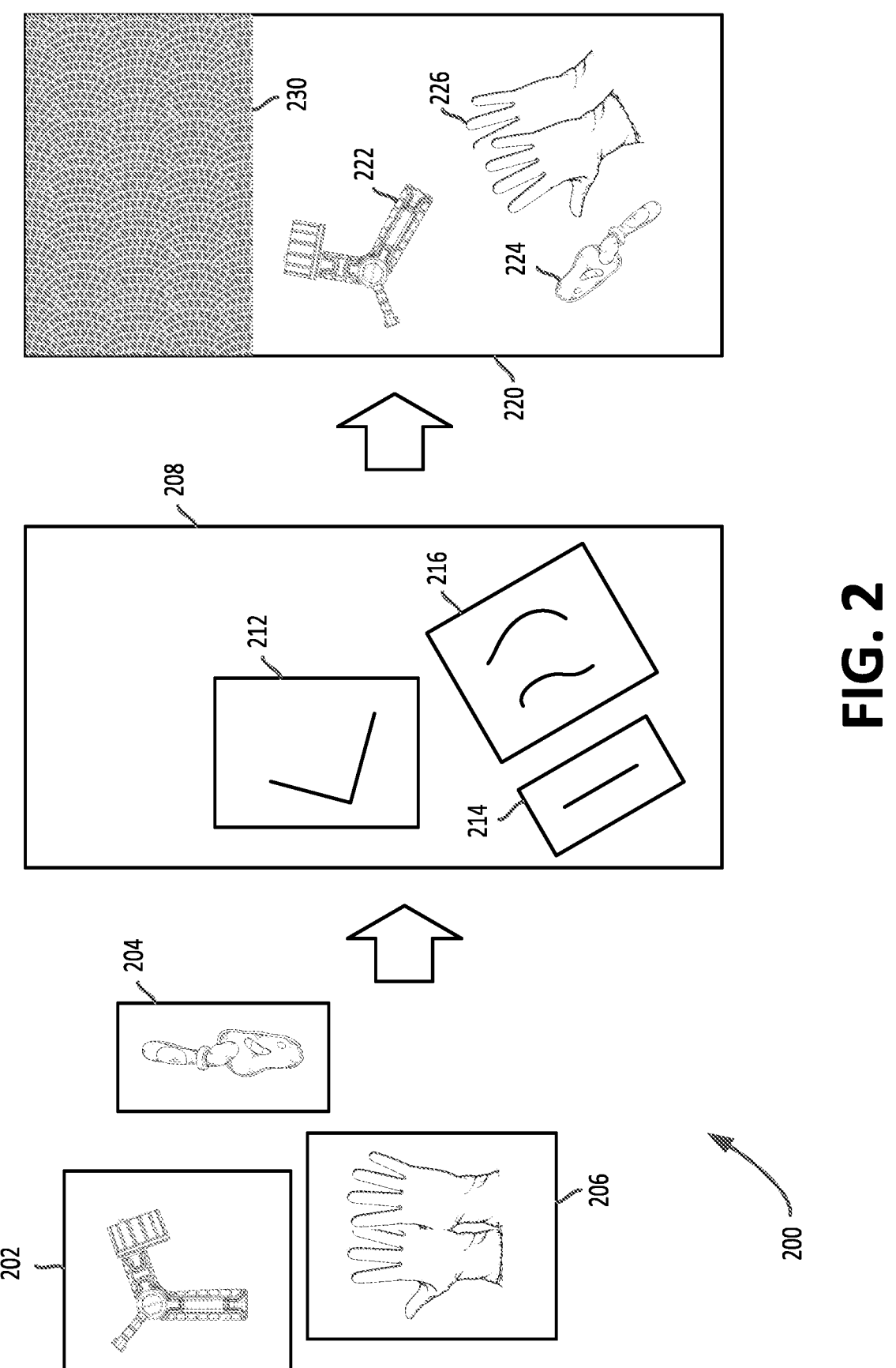
FIG. 2 is a diagram illustrating an example of automatic generation of composite images, according to certain embodiments.

FIG. 2 is a diagram illustrating an example 200 of automatic generation of composite images, according to certain embodiments. In example 200, input images include input objects to be included in a composite image according to certain embodiments. For purposes of this example, the garden implements previously discussed shall be used. Input image 202 includes a watering nozzle. Input image 204 includes a garden tool, namely, a trowel. Input image 206 includes a pair of gardening gloves. A generative image model, for example, generative image model 110, uses these input images to create representative image 208. Representative image 208 includes generated objects 212, corresponding to the nozzle in input image 202, generated object 214, corresponding to the trowel in input image 204, and generated object 216, corresponding to the gardening gloves in input image 206. The generated objects are in inferred dispositions based on metadata included in or corresponding to the input images.

Continuing with FIG. 2, prompts are generated by a prompt generation module. These image generation prompts take into account the context of the input images, and/or input objects so that the final composite image will possess an appropriate level of salience and will have the input objects displayed in a relevant context. The metadata 116 associated with the objects and/or their images can be used to interpret context. The image mask module 120 removes generated objects from the representative image 208, and the image overlay module 122 overlays the input objects. Additional environmental background information is also generated from context. The composite image 220 includes input objects such as the water nozzle 222 garden trowel 224 and gardening gloves 226 positioned according to inferred dispositions 124 and in a relevant context. For example, composite image 220 includes the objects positioned next to a garden walkway 230.

FIG. 3 is a flowchart of an example of a process 300 for automatic generation of composite images, according to some embodiments. In this example, a computing device carries out the process by executing suitable program code, for example, computer program code executable to provide a marketing portal application such as portal application 102. At block 302, the computing device running the portal application produces a representative image corresponding to a composite image. The computing devices can use a generative image model to produce a representative image, for example, representative image 112. The representative image is based on a presentation context of the input objects and includes generated objects corresponding to the input objects. Producing the representative image can include optimizing an image generation prompt using inferred dispositions and providing the image generation prompt to the generative image model. The image generation prompt can be optimized by the prompt generation module. At block 304, the computing device segments the generated objects from the representative image. The computing devices uses the image mask module 120 to segment the generated objects. Image segmentation can identify an instance of an object against a background or among other objects and provide detection and segmentation to enable a mask that can be used to isolate an object. The generated objects are segmented to extract them from the representative image. At block 306, the computing device generates an inferred disposition of each of the generated objects as extracted from the representative image. The computing devices uses the image overlay module 122 to generate the inferred dispositions 124.

Continuing with FIG. 3, at block 308 of process 300, the computing device transforms each the input objects to the inferred disposition of a corresponding generated object from among the generated objects. The image overlay module 122 is used to transform the input objects to the inferred dispositions 124. Inferred disposition can include characteristics such pose, scale, perspective, and rotation. At block 310, the computing device renders or stores, in response to the transforming, the composite image 132 of the input objects. If the composite image is rendered, it can be displayed, as an example, on presentation device 108. The image can also be displayed over the web, or otherwise pushed to an end user device for display by an app or web browser. The image can also be stored and formatted for use in printed material, for example, mailings, sales flyers, or signage.

Figure 4:
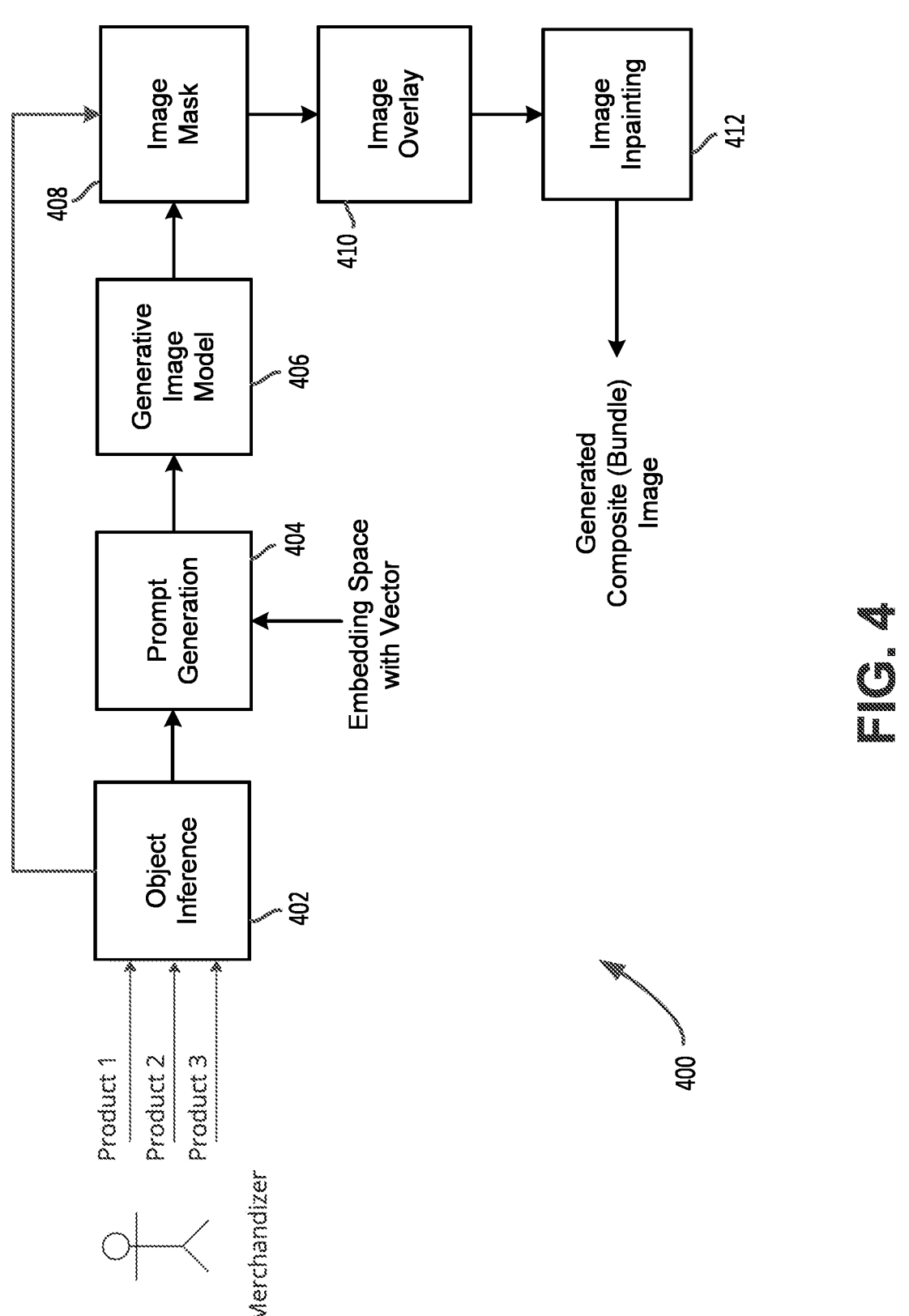
FIG. 4 is a block diagram of an example of a processing pipeline that provides automatic generation of composite images, according to certain embodiments.

FIG. 4 is a block diagram of an example of a processing pipeline 400 that provides automatic generation of composite images, according to certain embodiments. In this example merchandizer selects input photos of products for creation of a product bundle. In turn, the items selected become input objects for use in creating a composite image for use in an online catalog, or possibly printed material. Object inference module 402 receives the input objects corresponding to product 1, product 2, and product 3. Where embodiments are being used for merchandising, the object inference module 402 may be supplied with the entire record of a catalog item. Object inference module 402 is configured to infer the input objects from the plurality of input images. Object inference module 402 can infer the object as well as the location of the object in each of the individual product input images. The metadata can describe the objects, and the objects can be identified based in part on the metadata. For example, if the metadata indicates the product is a garden trowel, image recognition can be used to identify the garden trowel in the image as distinct from, as examples, a plant in the background or an image of a gardener that may appear in the input image.

Staying with FIG. 4, a prompt generation module 404 is configured to sample an embedding space around a vector that represents the presentation context. Prompt generation module 404 takes as input the output of the object inference module as well as an embedding space with a vector that represents context and generates an optimal set of prompts to feed the image generation process. In a merchandising context, an entire catalog item, which includes the text accompanying any image, may be used for prompt generation. Using a generative algorithm for prompts can ensure that input in the form of a set of textual prompts is provided to the generative image model 406 that is contextually relevant to, as examples, the commerce space, the industry vertical of the merchant, and/or the nature of the objects in the product bundle. The prompt generation algorithm can be a text generative model trained for the relevant use case. For a merchandizer making use of a system to create composite images for product bundles, the model is trained for a commerce use case. Generative image model 406 is configured to produce the representative image corresponding to the composite image based on a presentation context of the input objects. The generative image model 406 is then fed the prompts generated by the previous module and produces a representative image with the individual products/objects occurring within it. At this stage, the generative model produces a representative image such as representative image 208 with objects similar to the objects from the input images, but not the exact objects as depicted in the original individual product images.

After the representative image is generated in pipeline 400 of FIG. 4, the actual item images are placed where the programmatically generated objects occur in the generated, representative product bundle image. The image mask module 408 segments the image and provides object recognition to extract the generated objects from the representative image. Image mask module 408 is configured to segment the generated objects from the representative image. The disposition of the generated objects is then inferred by the image overlay module 410 to accurately overlay of the original, input objects into the generated composite image. The inferred disposition includes visual characteristics such as pose, size or scale, rotation, and perspective. Image overlay module 410 is configured to transform input objects to an inferred disposition of a corresponding generated object.

Note that in FIG. 2, the rotation angles of the objects and scale of the trowel have been changed to match that of the generated objects in representative image 208. The image overlay module 410 in FIG. 4 makes use of pose and perspective inference algorithms to infer the product/object pose, rotation, and scale within the generated image bundle and then uses the inferred angle/rotation/perspective to apply a similar viewpoint transformation to the original individual product images so as to overlay the original input objects where the generated objects occur in the composite image. The image overlay process may be incomplete, leaving gaps in the composite image. In this case, an image inpainting module 412 can fill in any blanks that may have occurred as a result of the object replacement algorithms of the previous two modules in processing pipeline 400. After any inpainting, the generated composite, or bundle, image is produced.

Figure 5:
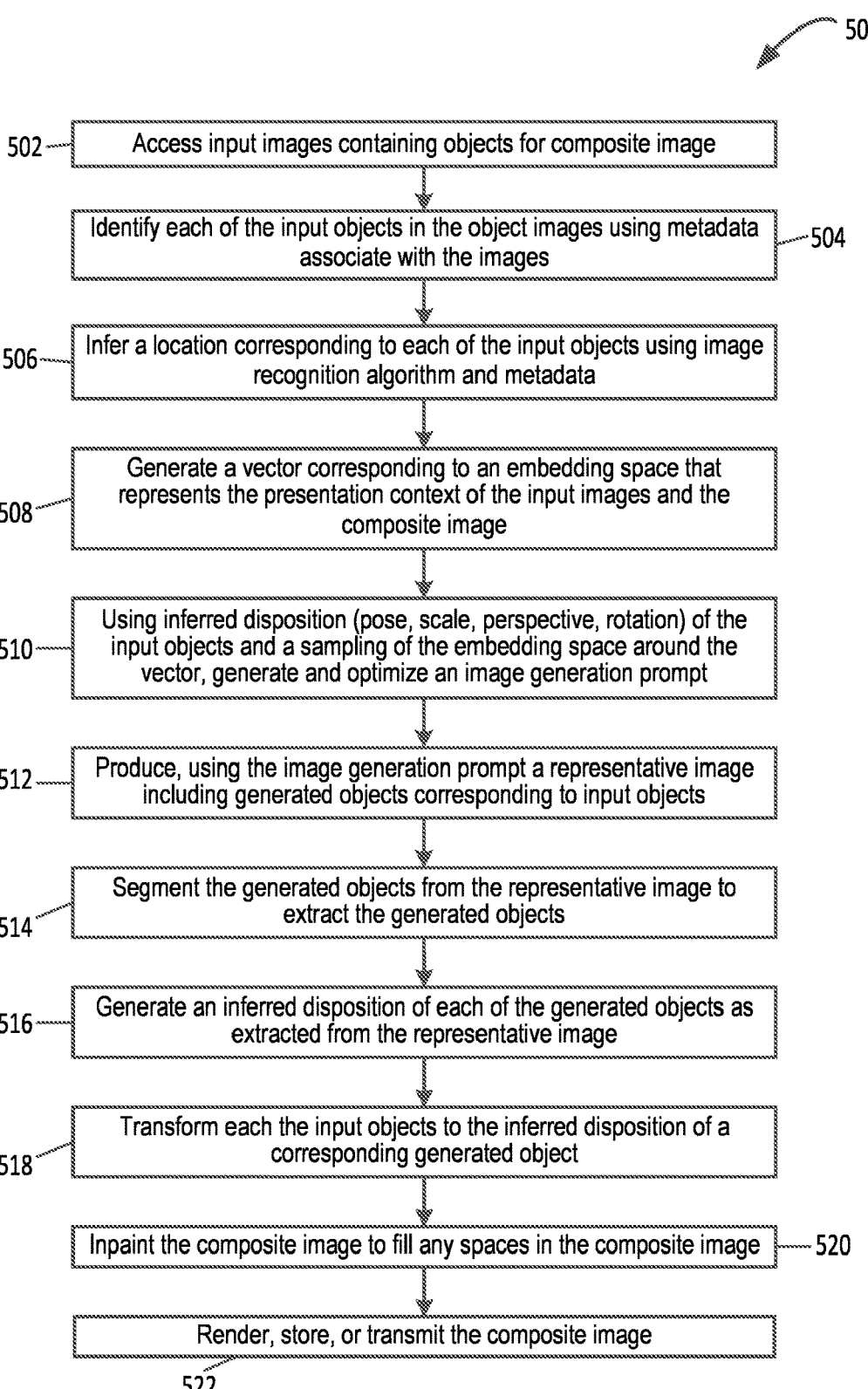
FIG. 5 is a flowchart of another example of a process for automatic generation of composite images, according to some embodiments.

FIG. 5 is a flowchart of another example of a process 500 for automatic generation of composite images, according to some embodiments. In this example, a computing device carries out the process by executing suitable program code, for example, computer program code for an administrative portal application such as portal application 102. At block 502, the computing device accesses input images containing objects for the composite image. Access may be triggered, as an example, by a merchandizer using administrative portal application 102 selecting digital photographs from database 106 of products to be bundled. At block 504, the computing device identifies each of the input objects in the input images using metadata associated with the images. The object inference module 402 may be supplied with the entire record from a database, for example, by using a JavaScript object notation (JSON) object that includes name, model, description, etc. All the attributes, product description, product name, any other specifications available with the product, and the images themselves, as well as any multimedia may be provided and may be described in the metadata.

From this information, the object inference module infers the object. At bock 506, the computing device infers a location corresponding to each of the input objects using an image recognition algorithm and the metadata from the record, for example, using object inference module 402. The locations of the objects or items are isolated in order to distinguish an object from the background and other items in each image. The object inference module can infer the location corresponding to an object based at least in part on the metadata, and can then identify the object based on the location, the metadata, and the output of an image recognition algorithm. At block 508, the computing device generates a vector corresponding to an embedding space that represents the presentation context of the input images and the composite image.

The prompt generation algorithm takes as input the output of the object inference module and generates an optimal set of prompts to feed the image generation algorithm. The prompt generation algorithm can include a text generative model trained for a relevant use case. For example, a merchandizer seeking to obtain a composite image for a product bundle may need a model trained for commerce. The prompts are configured to ensure that the image generative model receives text samples that are contextually relevant to the environment in which the system is being used. For example, in the merchandising context, the industry vertical of an online store and the nature of the objects in the product bundle may be used for the prompts. As an example, an industry vertical for the gardening implements previously discussed might be related to horticulture or home maintenance. As another example, if the bundle includes tennis balls and a tennis racket, the prompts may be relevant to the industry vertical, the merchant, and so on, for tennis, or sporting goods.

Continuing with FIG. 5, at block 510, the computing device, using the inferred disposition of the input objects and a sampling of the embedding space around the vector, generates and optimizes an image generation prompt to provide to generative image model 406. At block 512, the computing device produces, using the image generation prompt(s), a representative image including generated objects corresponding to input objects. At block 514, the computing device segments the generated objects from the representative image to extract the generated objects, and at block 516, the computing device generates an inferred disposition of each of the generated objects as extracted from the representative image. Disposition can include characteristics such as pose, scale, perspective, and rotation, as examples. Image segmentation can identify an instance of an object against a background and/or other objects in the image and provide detection and segmentation to enable a mask that can be used isolate an object.

Image segmentation can be graph based, for example using graph feature fusion and/or edge detection. Alternatively, parts of the image can be classified using machine-learning techniques and the same object detection used to identify input objects can be used to build a bounding box corresponding to each class in the image. Once the portions of the image are isolated by classification, a model that is trained with the classifications can identify the object as distinct from the background or other objects. At block 518, the computing device transforms each the input objects to the inferred disposition of a corresponding generated object and overlays the input objects onto the representative image, for example, using image overlay module 410. The functions included in blocks 514 through 518, all discussed with respect to FIG. 5, can be used in implementing a step for transforming each the input objects to an inferred disposition of a generated object in the representative image to produce the composite image of the input objects.

The overlaying of the input objects can be accomplished using pose and perspective inference algorithms to infer the product/object disposition, including pose, rotation, and scale within the generated image bundle. Such an algorithm can use the inferred angle, rotation, and/or perspective to apply an appropriate viewpoint transformation to the original individual product images. The transformation can overlay the original input objects where the generated objects occur in the composite image.

At block 520 of FIG. 5, the computing device inpaints the resulting composite image to fill any spaces in the image resulting from slight differences between the form or disposition of the generated objects and the form or disposition of the input objects. Image inpainting can be texture synthesis based, or can make use of a searching algorithm. At block 522 of process 500, the computing device renders, stores, or transmits the composite image of the bundled items or products for use in an online catalog, printed material, or messaging, as examples. The composite image output by process 500 can be stored in cloud storage, at a server, or locally, for example in computing device 101 or storage devices connected locally to computing device 101.

Figure 6:
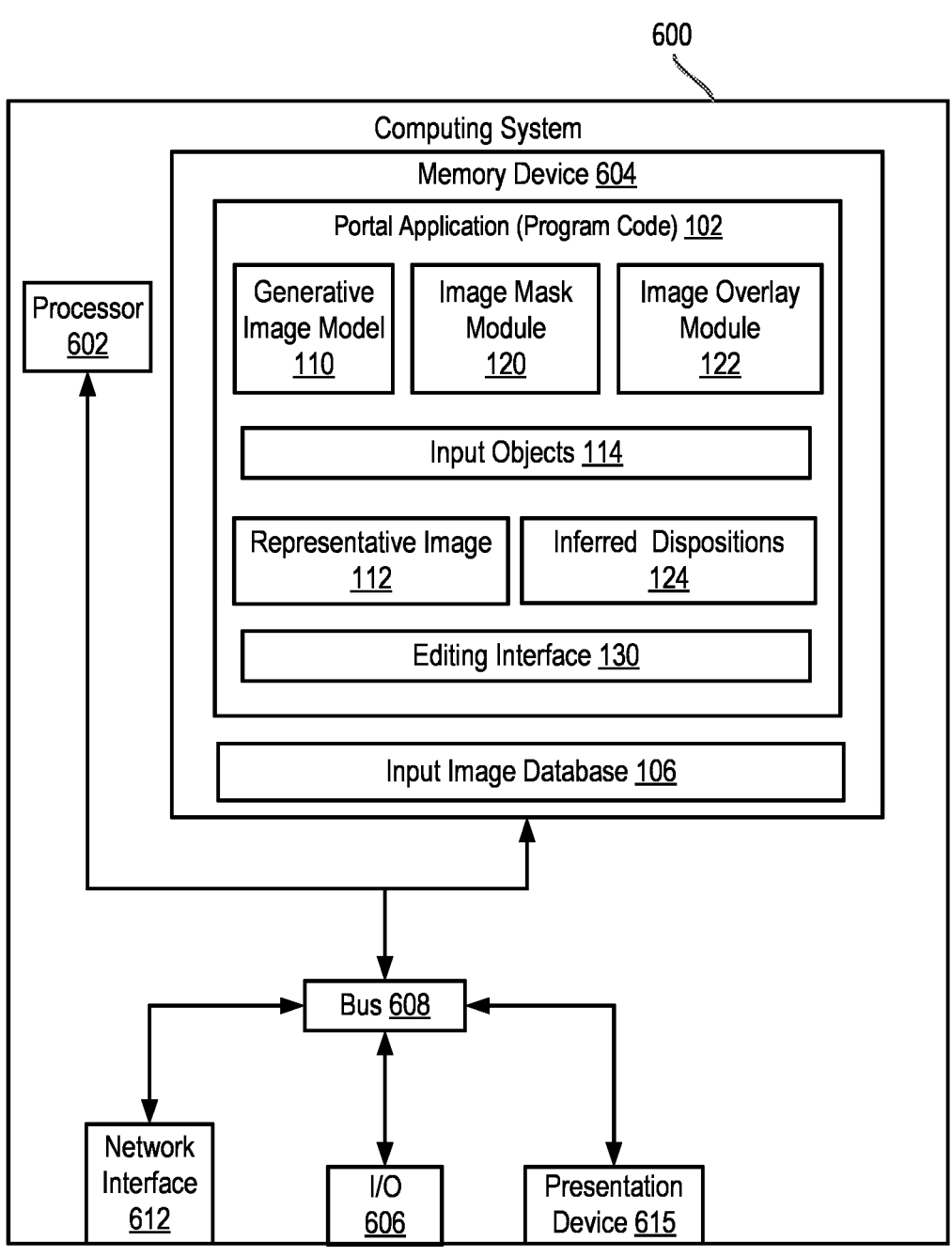
FIG. 6 is a diagram of an example of a computing system that can implement aspects of automatic generation of composite images, according to certain embodiments.

FIG. 6 depicts a computing system 600 that executes the portal application 102 with the capability implementing aspects of automatic generation of composite images, according to certain embodiments. System 600 includes a processing device 602 communicatively coupled to one or more memory components 604. The processing device 602 executes computer-executable program code stored in the memory component 604. Examples of the processing device 602 include a processor, a microprocessor, an application-specific integrated circuit ("ASIC"), a field-programmable gate array ("FPGA"), or any other suitable processing device. The processing device 602 can include any number of processing devices, including a single processing device. The memory component 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read executable instructions. The executable instructions may include processor-specific instructions generated by a compiler or an interpreter from code written in any suitable computer-programming language, including, for example, C, C++, C#, Visual Basic, Java, Python, Perl, and JavaScript.

Still referring to FIG. 6, the computing system 600 may also include a number of external or internal devices, for example, input or output devices. For example, the computing system 600 is shown with one or more input/output ("I/O") interfaces 606. An I/O interface 606 can receive input from input devices such as a camera to capture images to be provided as image files or provide output to output devices (not shown), for example, to display production image selections. One or more buses 608 are also included in the computing system 600. The bus 608 communicatively couples one or more components of a respective one of the computing system 600.

The processing device 602 executes program code (executable instructions) that configures the computing system 600 to perform one or more of the operations described herein. The program code includes, for example, portal application 102 or other suitable applications that perform one or more operations described herein and/or to cause the processing device 602 to perform the operations. The program code may be resident in the memory component 604 or any suitable computer-readable medium and may be executed by the processing device 602 or any other suitable processing device. Memory component 604, during operation of the computing system, executable portions of the portal application, for example, generative image model 110, image mask module 120, image overlay module 122, and/or editing interface module 130, can access portions as needed. Memory component 604 is also used to temporarily store representative image 112, and input objects 114, as well as other information or data structures, shown or not shown in FIG. 6. Memory component 604 may also store input image database 106 and inferred dispositions 124.

The system 600 of FIG. 6 also includes a network interface device 612. The network interface device 612 includes any device or group of devices suitable for establishing a wired or wireless data connection to one or more data networks. Non-limiting examples of the network interface device 612 include an Ethernet network adapter, a wireless network adapter, and/or the like. The system 600 is able to communicate with one or more other computing devices (e.g., another computing device executing other software, not shown) via a data network (not shown) using the network interface device 612. Network interface device 612 can also be used to communicate with network or cloud storage used as a repository for product images that can be input to the portal application 102. Such network or cloud storage can also include updated or archived versions of the portal application for distribution and installation.

Staying with FIG. 6, in some embodiments, the computing system 600 also includes the presentation device 615 depicted in FIG. 6. A presentation device 615 can include any device or group of devices suitable for providing visual, auditory, or other suitable sensory output. In examples, presentation device 615 displays composite images. Non-limiting examples of the presentation device 615 include a touchscreen, a monitor, a separate mobile computing device, etc. In some aspects, the presentation device 615 can include a remote client-computing device that communicates with the computing system 600 using one or more data networks. System 600 may be implemented as a unitary computing device, for example, a notebook or mobile computer. Alternatively, as an example, the various devices included in system 600 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "accessing," "transforming," "generating," "processing," "computing," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:

accessing a plurality of items from a stored catalog, each item including an image and a text description of the image;

determining, using at least one of image metadata or the text description, semantic content for each input image of a plurality of input images from the plurality of items, each including the image metadata and depicting an input object from the plurality of items;

generating a presentation context for a composite image based on the semantic content from the plurality of the images;

applying a text generative model to the image, the image metadata, and the text description to generate a text-based, contextually relevant prompt for a trained generative image model configured to provide contextual relevance for a commerce space;

prompting, using the text-based, contextually relevant prompt, the trained generative image model to produce a representative image corresponding to the composite image, the representative image including a plurality of generated objects, each generated object corresponding to one of a plurality of input objects;

segmenting, using an image mask module, the plurality of generated objects from the representative image to extract the plurality of generated objects from the representative image;

generating, using an image overlay module and the image metadata, an inferred disposition of each of the plurality of generated objects as extracted from the representative image;

transforming, using the image overlay module, each of the plurality of input objects to the inferred disposition of a corresponding generated object from the plurality of generated objects; and rendering, in response to the transforming, the composite image of the plurality of input objects within the presentation context.

2. The method of claim 1, further comprising inpainting the composite image to fill any spaces in the composite image.

3. The method of claim 1, further comprising optimizing, using the inferred disposition, the text-based, contextually relevant prompt.

4. The method of claim 3, further comprising:

generating a vector corresponding to an embedding space that represents the presentation context;

sampling the embedding space around the vector; and optimizing the text-based, contextually relevant prompt at least in part in response to the sampling of the embedding space.

5. The method of claim 1, wherein the inferred disposition comprises pose, scale, perspective, and rotation.

6. The method of claim 1, further comprising inferring, using an object inference module, a location corresponding to each of the plurality of input objects in a plurality of object images.

7. The method of claim 6, further comprising:

identifying each of the plurality of input objects based in part on the image metadata; and inferring the location corresponding to each of the plurality of input objects based at least in part on the image metadata.

8. A system comprising:

a memory component;

a processing device coupled to the memory component to perform operations of accessing a plurality of items from a stored catalog, each item including an image and a text description of the image, and causing a composite image of the plurality of items to be transmitted, stored, or displayed;

an object inference module configured to determine, using at least one of image metadata or the text description, semantic content for each input image of a plurality of input images, each including the image metadata and depicting an input object from the plurality of items, and generate a presentation context for the composite image based on the semantic content;

a text generative model configured to generate, based on the image, the image metadata, and the text description, a text-based, contextually relevant prompt for a trained generative image model configured to provide contextual relevance for a commerce space;

a trained generative image model configured to produce, in response to the text-based, contextually relevant prompt, and based on the presentation context, a representative image corresponding to the composite image based on the presentation context, the representative image including a plurality of generated objects, each generated object corresponding to one of the input objects;

an image mask module configured to segment the plurality of generated objects from the representative image to extract the plurality of generated objects from the representative image; and an image overlay module configured to transform, using the image metadata, each of the input objects to an inferred disposition of a corresponding generated object from the plurality of generated objects to produce the composite image of the input objects within the presentation context.

9. The system of claim 8, further comprising an inpainting module configured to fill any spaces in the composite image.

10. The system of claim 8, wherein the object inference module is further configured to infer the input objects from the plurality of input images.

11. The system of claim 8, further comprising a prompt generation module configured to sample an embedding space around a vector that represents the presentation context and optimize the text-based, contextually relevant prompt to cause the trained generative image model to produce the representative image.

12. The system of claim 8, wherein the inferred disposition comprises pose, scale, perspective, and rotation.

13. The system of claim 8, wherein the input objects and the presentation context of the input objects are identified based at least in part on the image metadata.

14. A non-transitory computer-readable medium storing executable instructions, which when executed by a processing device, cause the processing device to perform operations comprising:

accessing a plurality of items from a stored catalog, each item including an image and a text description of the image;

determining, using at least one of image metadata or the text description, semantic content for each input image of a plurality of input images from the plurality of items, each including the image metadata and depicting an input object from the plurality of items;

generating a presentation context for a composite image based on the semantic content from the plurality of the images;

applying a text generative model to the image, the image metadata, and the text description to generate a text-based, contextually relevant prompt for a trained generative image model configured to provide contextual relevance for a commerce space;

prompting, using the text-based, contextually relevant prompt, the trained generative image model to produce a representative image corresponding to the composite image, the representative image including a plurality of generated objects, a generated object corresponding to one of a plurality of input objects;

a step for transforming, based on the image metadata, each of the plurality of input objects to an inferred disposition of the generated object in the representative image to produce the composite image of the plurality of input objects; and rendering the composite image of the plurality of input objects within the presentation context.

15. The non-transitory computer-readable medium of claim 14, wherein the instructions further cause the processing device to perform operations comprising inpainting the composite image to fill any spaces in the composite image.

16. The non-transitory computer-readable medium of claim 14, wherein the instructions further cause the processing device to perform operations further comprising optimizing, using the inferred disposition, the text-based, contextually relevant prompt.

17. The non-transitory computer-readable medium of claim 16, wherein the instructions further cause the processing device to perform operations comprising:

generating a vector corresponding to an embedding space that represents the presentation context;

sampling the embedding space around the vector; and optimizing the text-based, contextually relevant prompt at least in part in response to the sampling of the embedding space.

18. The non-transitory computer-readable medium of claim 14, wherein the inferred disposition comprises pose, scale, perspective, and rotation.

19. The non-transitory computer-readable medium of claim 14, wherein the instructions further cause the processing device to perform operations comprising inferring a location corresponding to each of the plurality of input objects in each of the plurality of input images based at least in part on the image metadata.

20. The non-transitory computer-readable medium of claim 19, wherein the instructions further cause the processing device to perform operations comprising:

identifying each of the plurality of input objects based in part on the image metadata; and inferring the location corresponding to each of the plurality of input objects based at least in part on the image metadata.

*    *    *    *    *